(12) United States Patent
Carsi

(10) Patent No.: US 9,150,103 B2
(45) Date of Patent: Oct. 6, 2015

(54) INNER ASSEMBLY OF A VEHICLE WITH DOUBLE CLIPS, AND VEHICLE HAVING SAID ASSEMBLY

(75) Inventor: Vicente Carsi, Valencia (ES)

(73) Assignee: Faurecia Interieur Industrie, Nanterre (FR)

( * ) Notice: Subject to any disclaimer, the term of this patent is extended or adjusted under 35 U.S.C. 154(b) by 588 days.

(21) Appl. No.: 13/304,142

(22) Filed: Nov. 23, 2011

(65) Prior Publication Data

US 2013/0129408 A1    May 23, 2013

(51) Int. Cl.
| | |
|---|---|
| *B60K 20/02* | (2006.01) |
| *F16B 5/06* | (2006.01) |
| *F16B 5/12* | (2006.01) |
| *F16H 59/02* | (2006.01) |

(52) U.S. Cl.
CPC ............... *B60K 20/02* (2013.01); *F16B 5/0692* (2013.01); *F16B 5/123* (2013.01); *F16H 59/0213* (2013.01); *Y10T 403/44* (2015.01)

(58) Field of Classification Search
CPC ......................... F16H 59/0208; F16H 59/0213
USPC .................. 403/325, 50, 51, 408.1; 74/473.1, 74/473.3, 473.18; 277/634–636
See application file for complete search history.

(56) References Cited

U.S. PATENT DOCUMENTS

| | | | | |
|---|---|---|---|---|
| 4,991,457 | A * | 2/1991 | Chen ........................... | 74/473.36 |
| 5,335,751 | A * | 8/1994 | Kuroki ........................ | 180/336 |
| 5,560,253 | A * | 10/1996 | Ishikawa et al. ............. | 74/473.3 |
| 5,887,485 | A * | 3/1999 | VanOrder et al. .......... | 74/473.15 |
| 7,017,436 | B2 * | 3/2006 | Winchell ...................... | 74/18.1 |
| 7,854,457 | B2 * | 12/2010 | Tanner ......................... | 296/1.08 |
| 2004/0069079 | A1 * | 4/2004 | Winchell ...................... | 74/18.1 |
| 2005/0000310 | A1 * | 1/2005 | Yamamoto et al. ......... | 74/473.18 |
| 2010/0061795 | A1 * | 3/2010 | Czepczak et al. ............. | 403/51 |

FOREIGN PATENT DOCUMENTS

FR        2868996 A1 *  10/2005

OTHER PUBLICATIONS

Machine Translation of FR2868996A1, Performed Nov. 21, 2014, www.espacenet.com, 6 pgs.*

* cited by examiner

*Primary Examiner* — Daniel Wiley
(74) *Attorney, Agent, or Firm* — Reising Ethington, P.C.

(57) ABSTRACT

An inner assembly that includes first, second and third structures, and a device for removably securing the first, second and third structures to one another. The securing device has at least one double clip which is fixed to the third structure, the double clip having first and second locking elements. The first and second structures have respectively first and second complementary locking elements. The securing device is movable between a locking position in which the first and second locking elements cooperate respectively with the first and second complementary locking elements and lock respectively the first and second structures to the third structure, and a free position in which the first and second locking elements do not cooperate respectively with the first and second complementary locking elements and the first and second structures are free with respect to the third structure.

18 Claims, 4 Drawing Sheets

INNER ASSEMBLY OF A VEHICLE WITH DOUBLE CLIPS, AND VEHICLE HAVING SAID ASSEMBLY

TECHNICAL FIELD

The invention relates to means adapted for securing to one another several structures of an inner assembly of a vehicle.

BACKGROUND

It is known to secure several structures to one another by mean of clips. Usually, several clips are necessary to secure a given structure to another one. It is sometimes difficult to arrange all the clips without interference between them when several structures are to be secured to one another in a narrow space.

JP2007-168492 discloses a securing device for fastening a center panel to the body of an instrument panel. The securing device comprises a clip with two fastening pawls, formed in the center panel. The instrument panel has a hole. When the center panel is mounted to the body, a first fastening pawl cooperates with the edge of the hole for fastening the center panel to the body. In case the vehicle is submitted to a front impact, the first fastening pawl may disengage from the hole. In this case, the second fastening pawl is arranged to cooperate with the edge of the hole and prevent the center panel from becoming completely separated from the body.

SUMMARY

Accordingly, it is an object of the invention to provide an inner assembly in which several structures can be removably secured to one another, and which is compact.

Said goal is achieved in one aspect of the invention by an inner assembly of the type having first, second and third structures, and a device for removably securing the first, second and third structures to one another, wherein the inner assembly is characterized in that: (a) the securing device has at least one double clip which is fixed to the third structure, the double clip having first and second locking elements; (b) the first and second structures have respectively first and second complementary locking elements; and (c) the securing device is movable between a locking position in which the first and second locking elements cooperate respectively with the first and second complementary locking elements and lock respectively the first and second structures to the third structure, and a free position in which the first and second locking elements do not cooperate respectively with the first and second complementary locking elements and the first and second structures are free with respect to the third structure.

The double clip may be used to removably secure the three structures to one another. It is not necessary to use a first clip for securing the first structure to the third structure, and a second clip for securing the second structure to the third structure. In a narrow space, it may be difficult to arrange too many clips side by side on the third structure. Therefore, the assembly of this aspect of the invention is compact.

The inner assembly may include one or several of the following features, considered individually or according to any technically feasible combination:

the double clip has a main wall, the first and second locking elements being two protrusions protruding with respect to the main wall;

both the first and second locking elements protrude toward the same side of the main wall;

the double clip has a main wall, a slit being cut in the main wall, said slit defining a flexible tongue in the main wall, said tongue bearing one of the first and second locking elements;

one of the first and second locking elements is located at a tip of the double clip opposite the third structure;

the first structure is a gear shift gaiter bag, the second structure is a console and the third structure is a cover cap for masking an edge of the gaiter bag;

the double clip is unitary with the cover cap;

the gaiter bag comprises a flexible bag and an inner frame fixed to the bag, the first complementary locking element being a part of the inner frame; and the assembly has at least two side covers located on two opposite sides of the gaiter bag, the cover cap having additional clips for locking the cover cap to the two side covers.

According to another aspect, there is provided a vehicle having an inner assembly as defined, characterized in that, considered along a longitudinal direction, the opening and the gaiter bag are located substantially at the same longitudinal position.

Advantageously, one of the side covers has an opening, the vehicle having a hand brake lever extending across the opening.

BRIEF DESCRIPTION OF THE DRAWINGS

Other features and advantages will become apparent from reading the description below, given purely as a non limitative example, with reference to the figures attached, in which.

DESCRIPTION OF THE ILLUSTRATED EMBODIMENTS(S)

Figure 1:
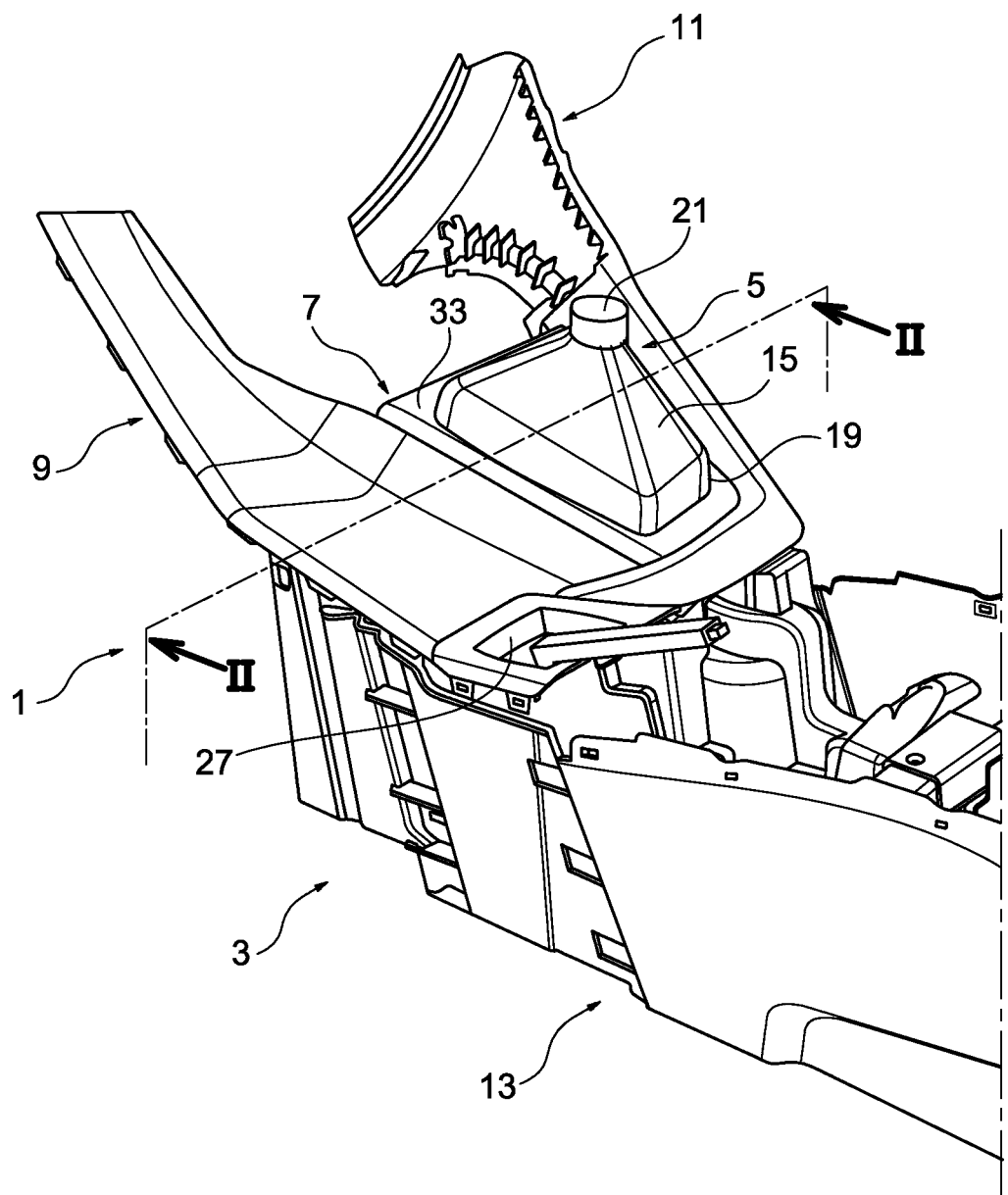
FIG. 1 is a view in perspective of the central console assembly of an automobile, the gear shift gaiter bag, the hand brake cover and the side cover being shown separated from the console.

The assembly 1 depicted on FIG. 1 is a central console assembly of an automobile. It is located between the two front seats, and fixed to the floor of the passenger cabin.

The assembly 1 includes the central console 3, a gear shift gaiter bag 5, a cover cap 7, a hand brake cover 9, and a side cover 11. All these parts are made of synthetic resin and are produced by moulding, notably injection moulding.

The central console 3 includes a tunnel 13, which is a structural part fixed to the floor of the passenger cabin. The gear shift gaiter bag 5, the cover cap 7, the hand brake cover 9, and the side cover 11 are all fixed to the tunnel 13.

Figure 2:
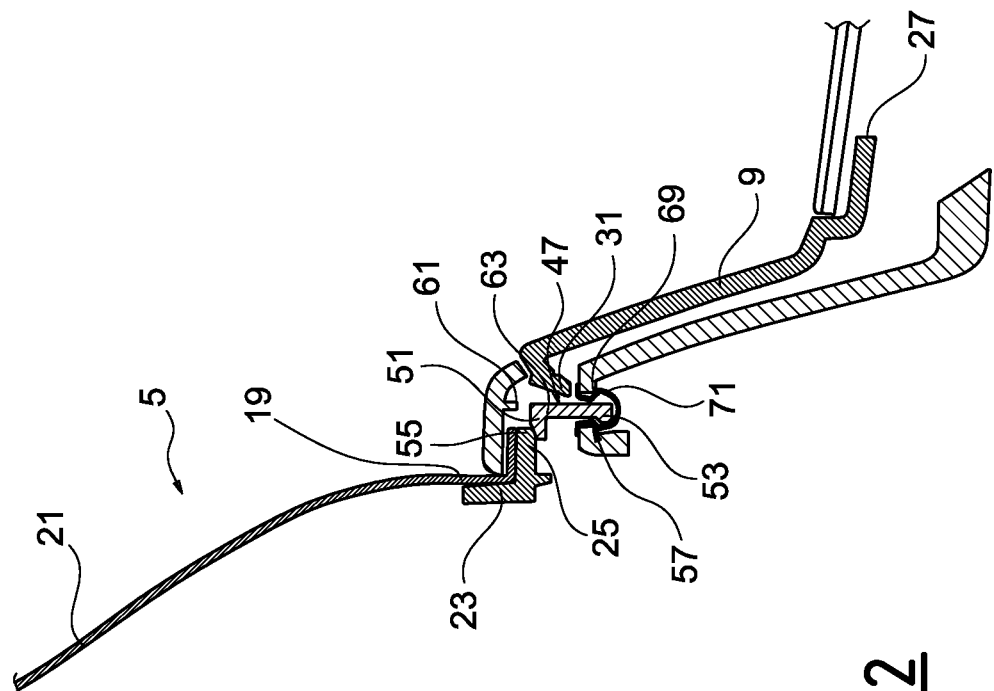
FIG. 2 is a transverse cross section of a part of the central console assembly taken along line II-II of FIG. 1.
Figure 2:
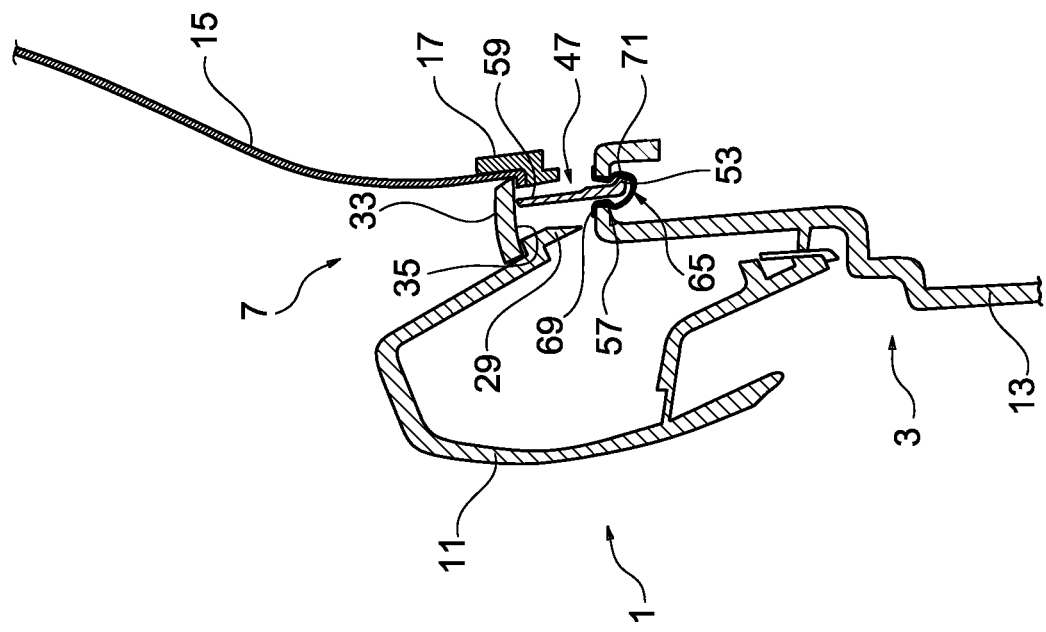
Figure 3:
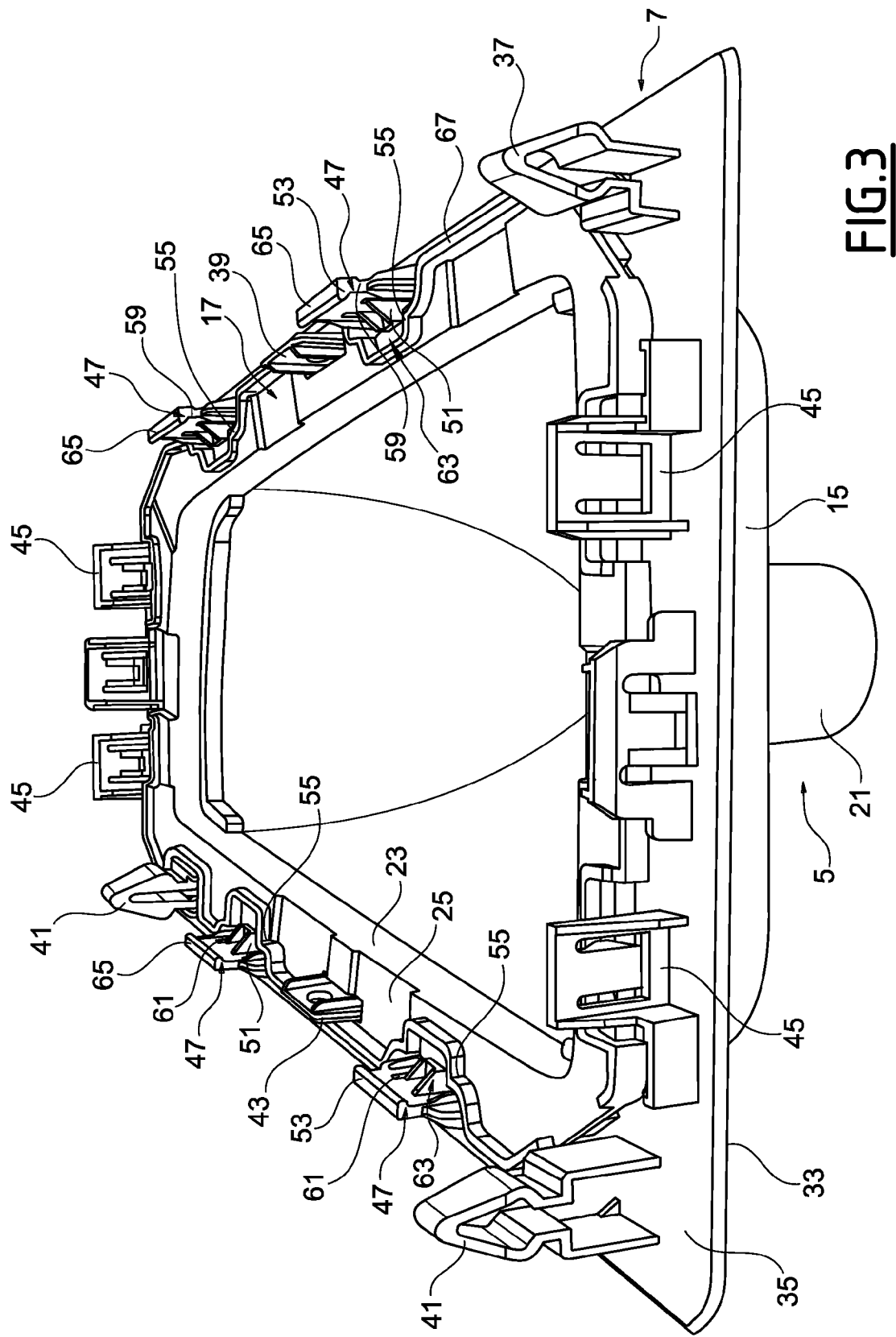
FIG. 3 is a view in perspective of the cover cap and the gaiter bag of FIGS. 1 and 2, from the bottom.

As depicted on FIGS. 2 and 3, the gear shift gaiter bag 5 includes a flexible bag 15 and an inner frame 17 fixed inside the bag. The bag 15 has a substantially pyramidal shape. It has a large open base 19 and a narrow open top 21. The gear shift (not depicted) extends through the bag, the handle of the gear shift projecting outside the bag through the open top 21.

The inner frame 17 is a rigid structure fixed to the base 19 of the bag 15. It has a closed contour, and is substantially rectangular in the example shown on the Figures. Considered in section, the frame presents a L shape, with two walls 23, 25, substantially perpendicular to one another. Wall 23 is fixed against the inner surface of the bag, around the open base 19.

Wall 25 extends toward the outside of the bag from the wall 23 and protrudes outside the bag. Wall 25 is located just below the free edge of the bag.

The side cover 11 is a mainly decorative structure, and covers a first lateral side of the tunnel 13. It is fixed to the tunnel by means which are not depicted on the Figures.

The hand brake cover 9 is another decorative structure, covering the second lateral side of the tunnel 13. It is fixed to the tunnel by means which are not depicted on the Figures. The hand brake cover has an opening 27 (FIG. 1), the assembly having a hand brake lever (not depicted) extending across the opening 27.

When considered along a longitudinal direction, the opening 27 and the gaiter bag 5 are located substantially at the same longitudinal position. The longitudinal direction is understood here as being the direction along which the vehicle normally moves.

As shown on FIG. 1, the opening 27 and the gaiter bag 5 are located side by side along the transverse direction.

The cover cap 7 is another frame. It has a closed contour, and is substantially rectangular in the example shown on the Figures. Its function is hiding the lower edge of the gaiter bag 5, the edge 31 of the hand brake cover 9 extending along the gaiter bag 5, and the edge 29 of the side cover 11 extending along the gaiter bag (FIG. 2). The lower edge of the gaiter bag 5 is defined by the wall 25 of the inner frame 17.

The cover cap 7 extends around the open base 19 of the bag 15. The bag 15 is engaged inside the cover cap and protrudes above the cover cap.

The cover cap is a substantially flat structure, with a visible top face 33 and a non visible lower face 35. The lower face 35 is turned toward the tunnel 13. As shown on FIG. 3, the lower face 35 bears a number of clips and a number of positioning projections.

The clips 37 are arranged for cooperating with holes (not depicted) of the side cover 11, in order to secure the cover cap 7 and the side cover 11 to one another. The projection 39 is arranged for cooperating with holes (not depicted) of the side cover, in order to locate the position of the cover cap 7 on the side cover 11.

The clips 41 are arranged for cooperating with holes (not depicted) of the hand brake cover 9, in order to secure the cover cap 7 and the hand brake cover 9 to one another. The projection 43 is arranged for cooperating with holes (not depicted) of the hand brake cover, in order to locate the position of the cover cap 7 on the hand brake cover 9.

The clips 45 are arranged for cooperating with the free edge of the inner frame 17 of the gaiter bag 5, in order to secure the cover cap 7 and the gaiter bag 5 to one another.

The clips 47 are double clips, arranged for removably securing the cover cap 7, the console 3 and the gaiter bag 5 to one another. More precisely, the clips 47 secure the cover cap 7, the tunnel 13 and the wall 25 of the inner frame of the gaiter bag to one another.

Figure 4:
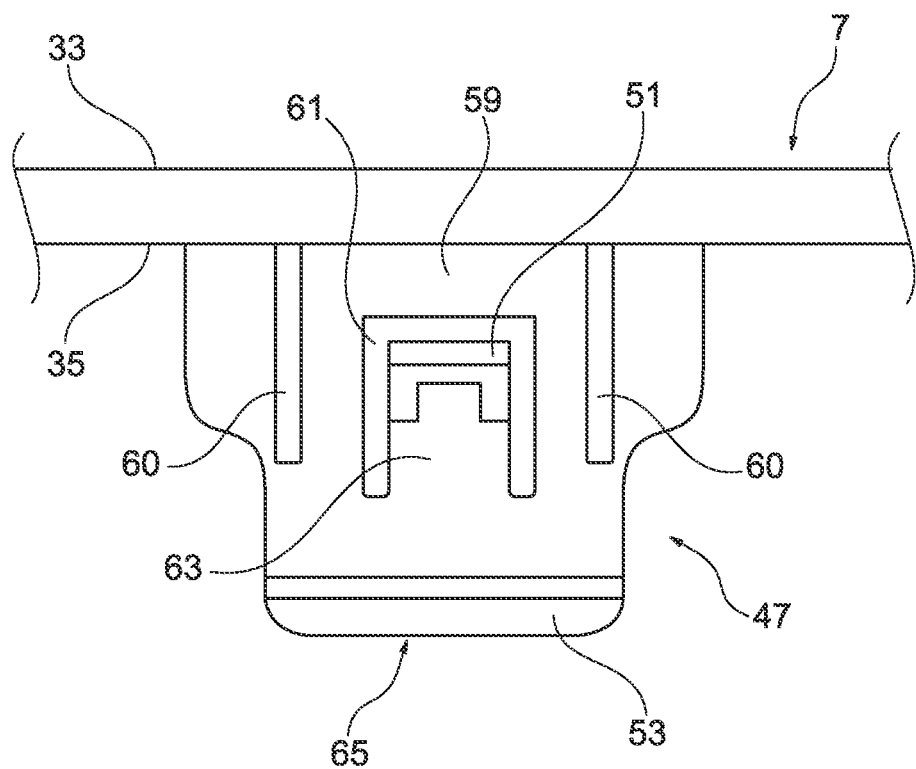
FIG. 4 is a front view of a double clip of the cover cap.

As shown on FIGS. 2 to 4, each double clip 47 has first and second locking elements 51 and 53, the wall 25 and the tunnel 13 having respectively first and second complementary locking elements 55 and 57 for cooperating with the first and second locking elements 51 and 53.

Each double clip 47 has a main wall 59, the first and second locking elements 51 and 53 being two protrusions protruding with respect to the main wall 59. The main wall 59 is substantially flat. The double clip 47 has stiffening ribs 60 for stiffening the main wall 59.

A slit 61 having substantially a U shape is cut in the main wall 59, said slit 61 defining a flexible tongue 63 in the main wall 59. The tongue 63 bears the first locking element 51.

The second locking element 53 is located at a tip 65 of the double clip, opposite the lower surface 35.

In the example of the Figures, both the first and second locking elements 51, 53 protrude toward the same side of the main wall 59. Alternatively, the first and second locking elements 51, 53 protrude toward opposite sides of the main wall 59.

The first complementary element 55 is a part of the free edge 67 of the wall 25 (FIG. 3).

The second complementary element 57 includes a hole 69 cut in the tunnel 13 and a metallic elastic clamp 71 (FIG. 2). The clamp 71 is fixed to the edge of the hole 69. It is opened toward the cover cap 7.

The double clip 47 has a locking position, shown on FIG. 2, in which the first locking element 51 is located below the wall 25, and more precisely projects below the part 55 of the free edge of the wall 25. The spacing between the lower face 35 of the cover cap and the first locking element 51 is such that part 55 is pinched between the lower face 35 and the first locking element 51. In the same locking position, the second locking element 53 is engaged inside the clamp 71 and retained in position by the clamp. In the first position, the cover cap 7, the gaiter bag 5 and the console 3 are secured to one another. Preferably clips 37, 41, 45, 47 and/or projections 39, 43 are made of a same material and in one piece with the cover cap 7. Alternatively clips and projections can be distributed among parts that compose the assembly. Advantageously, the double clips 47 are made of the same material and in one piece with the cover cap 7.

When the cover cap 7 needs to be taken away from the other structures, the double clip is moved to a free position, in which the first and second locking elements 51 and 53 are disengaged from the first and second complementary locking elements 55 and 57. For that purpose, the cover cap 7 is lifted away from the tunnel 13, with a force adapted for removing the first and second locking elements 51 and 53 of each double clip 47 from the corresponding first and second complementary locking elements 55 and 57. For each double clip, the shapes of the first and second locking elements 51 and 53, and of the corresponding first and second complementary locking elements 55 and 57, are adapted so that a force of a moderate intensity is sufficient for disengaging the locking elements 51, 53 and the complementary locking elements 55, 57 from one another. After said disengagement, the console 3 and the gaiter bag 5 are free with respect to the cover cap 7 in the area of the double clip.

The disengagement of all the second locking elements from all the corresponding second complementary locking elements permit separating a subassembly including the gaiter bag 5 and the cover cap 7 from the console 3. For separating the gaiter bag 5 from the cover cap 7, it is necessary to separate all the first locking elements 51 from all the corresponding first complementary locking elements 55, and to separate all the clips 45 from the gaiter bag 5.

The process for assembling the assembly 1 is described below.

At the beginning of the process, the gaiter bag 5 is already in position around the gear shift. The gear shift is already mounted to the drive line of the vehicle. It is mounted to the transmission of the vehicle, which is located inside the tunnel. The gear shift passes through the gaiter bag, with the handle protruding above the open top of the gaiter bag. The side cover 11 and the hand brake cover 9 are already fixed to the tunnel 13 by specific means.

In a first step, the cover cap 7 is fixed to the gaiter bag 5. More specifically, the cover cap 7 is first fixed to the inner frame 17, by mean of the clips 45 and of the first locking elements 51 of the double clips 47, coming into engagement with the parts 55 of the free edge of the inner frame.

In a second step, the cover cap 7 is fixed to the console 3. More specifically, the cover cap 7 is fixed the tunnel 13 by the second locking elements 53 of the double clips 47, coming into engagement with the elastic clamps 71. At the same step, the cover cap 7 is fixed to the side cover 11 and the hand brake cover 9, by means of the clips 37 and 41.

The invention has been described for an assembly including a gaiter bag, a console, and a cover cap. However, the invention applies to assemblies including first, second and third structures which are different from the structures above. The structures can be parts of a dashboard, of a seat, or a door. One or two of the structures can be trim parts, fixed to a third rigid structure. The assembly can include one or two cover caps.

The assembly described above is particularly advantageous. Since the opening 27 for the hand brakes and the gaiter bag 5 are located substantially at the same level, in a longitudinal direction, side by side, the space available for arranging the clips is very narrow. Using double clips, such as those described above, reduces the total number of clips necessary for fixing the parts of the assembly to each other, and makes it easier to arrange them all in a limited space. In addition it enables to get a constant gap between the cover cap and its surrounding parts. The assembly can thus exhibit a pleasant appearances.

The invention claimed is:

1. An inner assembly of a vehicle, said assembly comprising:
   first, second and third structures, wherein the first structure is a gear shift gaiter bag, the second structure is a console and the third structure is a cover can for masking an edge of the gaiter bag; and
   a device for securing said first, second and third structures to one another;
   wherein the device has a double clip fixed to the third structure, said double clip having first and second locking elements;
   wherein the first and second structures have respectively first and second complementary locking elements;
   wherein the gaiter bag comprises a flexible bag and a rigid inner frame distinct from the flexible bag and fixed to the bag, the first complementary locking element being a part of the rigid inner frame;
   wherein the device has a locking position in which the first and second locking elements of the double clip cooperate respectively with the first and second complementary locking elements of the first and second structures and lock respectively the first and second structures to the third structure; and
   wherein the device is removable from the first and second structures by lifting the third structure away from the first and second structures such that the device is moved to a free position in which the first and second locking elements are disengaged from the first and second complementary locking elements of the first and second structures.

2. The inner assembly according to claim 1, wherein the assembly has at least two side covers located on opposite sides of the gaiter bag and on opposite sides of the console, the cover cap having additional clips for locking the cover cap to the two side covers.

3. A vehicle having an inner assembly according to claim 2, wherein one of the side covers is a hand brake cover.

4. The vehicle according to claim 3, wherein the hand brake cover has an opening located substantially at the same longitudinal position as the gaiter bag.

5. The inner assembly according to claim 1, wherein the rigid inner frame presents an L shape and includes a first wall and a second wall extending substantially perpendicular to the first wall, the second wall protruding outside of the flexible bag, and the first complementary locking element of the gaiter bag is a part of a free edge of the second wall.

6. The inner assembly according to claim 1, wherein the second complementary locking element of the second structure comprises a hole in the second structure and a clamp fixed to an edge of the hole.

7. The inner assembly according to claim 1, wherein the cover cap has a closed contour, and the device has a plurality of double clips fixed to the cover cap, the double clips being spaced apart from one another along the contour of the cover cap.

8. The inner assembly according to claim 1, wherein the double clip has a main wall, and the first and second locking elements protrude from the main wall.

9. The inner assembly according to claim 1, wherein the double clip has a main wall and both the first and second locking elements protrude from the same side of the main wall.

10. The inner assembly according to claim 1, wherein the double clip has a main wall with a slit that defines a flexible tongue in the main wall, said tongue bearing one of the first and second locking elements.

11. The inner assembly according to claim 1, wherein one of the first and second locking elements of the double clip is located at a tip of the double clip opposite the third structure.

12. The inner assembly according to claim 1, wherein the double clip is unitary with the cover cap.

13. An inner assembly of a vehicle comprising:
   a central console including a tunnel;
   a gear shift gaiter bag positioned above the tunnel and including a flexible bag having an open base and a rigid inner frame fixed to the flexible bag, the rigid inner frame including a first wall fixed to the flexible bag and a second wall extending from the first wall to a free edge; and
   a cover cap extending around the open base of the flexible bag and having a non-visible lower face that faces toward the tunnel, the lower face of the cover cap bearing a double clip that extends from the lower face of the cover cap toward the tunnel;
   wherein the double clip has first and second locking elements, and the inner frame and the tunnel have respectively first and second complementary locking elements;
   wherein, when the double clip is in a locking position, the first and second locking elements of the double clip are engaged respectively with the first and second complementary locking elements; and
   wherein the double clip is movable from the locking position to a free position by lifting the cover cap away from the tunnel.

14. The inner assembly according to claim 13, wherein the cover cap is located outside of the flexible bag, and, when the double clip is in the locking position, a lower edge of the gear shift gaiter bag is hidden below the cover cap.

15. The inner assembly according to claim 13, wherein the cover cap is a substantially flat structure, the double clip has a substantially flat main wall that extends from the lower face of the cover cap toward the tunnel, and the first and second locking elements of the double clip protrude from the main wall.

16. The inner assembly according to claim 13, wherein the first complementary locking element of the inner frame comprises a part of the free edge of the second wall, and, when the double clip is in the locking position, the first locking element of the double clip is located below the second wall of the inner frame such that the part of the free edge of the second wall is pinched between the lower face of the cover cap and the first locking element of the double clip.

17. The inner assembly according to claim 13, wherein the second complementary locking element of the tunnel includes a hole in the tunnel and a clamp fixed to an edge of the hole, and, when the double clip is in the locking position, the second locking element of the double clip is engaged inside the clamp of the second complementary locking element of the tunnel.

18. The inner assembly according to claim 13, wherein the second wall of the inner frame extends substantially perpendicular to the first wall of the inner frame and defines a lower edge of the gear shift gaiter bag.

\* \* \* \* \*